United States Patent [19]

Wolkstein

[11] Patent Number: 4,626,441

[45] Date of Patent: Dec. 2, 1986

[54] DIETETIC FROZEN DESSERTS CONTAINING ASPARTAME

[76] Inventor: Melvin Wolkstein, 24 Mayhew Dr., South Orange, N.J. 07079

[21] Appl. No.: 539,661

[22] Filed: Oct. 6, 1983

[51] Int. Cl.⁴ .......................... A23G 9/02; A23L 1/236; A23L 1/307; A23L 1/308

[52] U.S. Cl. .................................... 426/548; 426/565; 426/583; 426/567; 426/61; 426/63; 426/804; 426/658; 426/613

[58] Field of Search ............... 426/548, 804, 567, 658, 426/583, 613, 61, 63

[56] References Cited

U.S. PATENT DOCUMENTS

| | | | |
|---|---|---|---|
| 3,780,189 | 12/1973 | Scott | 426/548 |
| 4,001,456 | 1/1977 | Glicksman | 426/548 |
| 4,024,290 | 5/1977 | Layton | 426/565 |
| 4,031,259 | 6/1977 | Lugay | 426/548 |
| 4,081,566 | 3/1978 | Haber | 426/583 |
| 4,096,285 | 6/1978 | Burge et al. | 426/548 |
| 4,158,068 | 6/1979 | Lipinski | 426/548 |
| 4,228,198 | 10/1980 | Burge | 426/548 |
| 4,254,154 | 3/1981 | Eisenstadt | 426/548 |
| 4,308,294 | 12/1981 | Rispoli et al. | 426/567 |
| 4,435,439 | 3/1984 | Morris | 426/565 |

Primary Examiner—Jeanette Hunter

[57] ABSTRACT

Dietetic desserts containing as the sweetener and bulking agents therein in place of all or a part of the sweeteners and bulking agents in similar non-dietetic frozen desserts, a sufficient amount of aspartame alone or in mixtures with a synergistic sweetener, and polydextrose, microcrystalline cellulose, fermented whey, tofu or sucrose polyester or mixtures thereof, or additionally containing sugar alcohols, sugars or enzymes such as rennet and/or lactase to provide a dessert with satisfactory taste and structure and methods of making them.

27 Claims, No Drawings

DIETETIC FROZEN DESSERTS CONTAINING ASPARTAME

BACKGROUND OF THE INVENTION

This invention relates to dietitic frozen desserts which have essentially all the sugar normally in their non-dietitic counterparts replaced by a sufficient amount of an aspartame(L-aspartyl-L-phenylalanine methyl ester) sweetener composition and a bulking agent composition to provide a dietetic frozen dessert having acceptable taste and structure as evidenced by so-called "mouthfeel". Typical of the frozen desserts contemplated are ice cream, ice milk, sherbet, frozen yogurt, frozen custard, sorbet, ices, tofuti and imitation ice cream (mellorine or parevine types).

In previous attempts to reduce the caloric content of frozen desserts, only part of the sugar was replaced by sweeteners such as aspartame. This was necessary because the amount of aspartame required to replace a given volume of sugar and keep the same sweetness level is very small as aspartame is about 200 times as sweet as sugar. This results in a reduction in volume which has a deleterious effect on the structure of the dessert, causing the mouthfeel to be inferior and an inferior product to result.

McPherson et al., J. Food Sci. 43, 934, (1978) used aspartame to supply up to 37.5% of the sweetness of sherbet. This resulted in a modification to the mix stabilization and a small reduction in the caloric content.

Searle Consumer Products Division of Searle Pharmaceuticals Inc. has technical bulletins published in 1983, one of which discloses the use of Equal low calorie sweetener with aspartame in recipes for consumer use and the other for industrial users discloses the uses of aspartame in a variety of formulations. Neither bulletin discloses the use of aspartame in combination with another non-caloric or low caloric sweetener having synergistic sweetening properties with aspartame in frozen desserts. Searle has thus not made available to the public any technical information or guidance on the use of aspartame and its synergistic sweeteners in frozen dietetic desserts.

Anderson, J., "Unforbidden Desserts", Arbor House, New York, N.Y., (1982) used aspartame as a sweetener for ice cream but required corn syrup solids, sugar or gelatin as bulking agents. This resulted in only a small reduction in the caloric content.

The Journal of Commerce, Sept. 2, 1983 reported that Pfizer Chemical Division has received approval from the U.S. FDA for the use of polydextrose in frozen dairy desserts.

Pfizer Chemical Division in a brochure entitled "Polydextrose reduced calorie bulking agent" (1983) does not disclose any frozen desserts with aspartame.

Smiles, "Chemistry of Foods and Beverages: Recent Developments", Academic Press Inc. New York, N.Y. (1982) and in "The Functional Application of Polydextrose" (1983) discusses the use of polydextrose as a low calorie (1 cal/gm) bulking agent in foods which gives them the texture and mouthfeel qualities normally provided by sugar and fat. There are no discussions or references to frozen desserts or to aspartame.

Figdor et al., "Caloric Utilization and Disposition of $^{14}C$-Polydextrose in Rat and Man", AGFD, paper 199, (1983) disclose that polydextrose is a tasteless non-sweet low calorie bulking agent formed by the random polymerization of glucose with lesser amounts of sorbitol and citric acid. It is not adsorbed after being orally ingested and the major portion is excreted in the feces. Polydextrose has approximately 1 cal/gm or about 25% the value of glucose. Figdor et al., in addition, state that polydextrose is intended as a total or partial replacement for sugar and as a partial replacement for the bulk of fat and flour in a variety of common processed foods with a resultant reduction in calories. No mention is made of frozen desserts or aspartame.

FMC Corporation, in Bulletin RC-52 entitled "Avicel microcrystalline cellulose in frozen desserts" and Bulletin C-55 entitled "Avicel Application Bulletin" (1980) disclose the use of Avicel as a stabilizer for various frozen desserts. None of the disclosed formulations contain aspartame or aspartame synergist sweeteners.

There is research ongoing in the field of low-calorie frozen desserts. D. H. Goff and W. K. Jordan of the Department of Food Science and Cornell University in Ithaca, N.Y. have been unsuccessful in formulating low calorie frozen desserts since they require the use of corn syrup solids or sorbitol. This is also disclosed in Goff et al., "Aspartame and Corn Syrup Solids as Sweeteners for Ice Cream", Modern Dairy, 62 (3), (1983), on previous Goff work.

Ms. N. Knezevich, author of "Mina's Sugarless Ice Cream Parlour", Elmhurst, N.Y. has developed 25 recipes using aspartame instead of sugar in a variety of frozen desserts. None of the recipes include aspartame and a non-caloric synergist sweetener used in combination with polydextrose or other bulking agents.

Because of increased attention given to controlled caloric intake in the diet, dietitic frozen desserts with non-sugar sweeteners are a very desirable product.

BRIEF SUMMARY OF THE INVENTION

This invention provides dietetic frozen desserts in which the sugar normally in such desserts as well as some of the milk, animal and/or vegetable fats, lactose and milk solids are replaced by low calorie sweetener-bulking agent compositions. In another aspect, this invention provides an aspartame-containing composition which can be used in dietetic frozen desserts free of or low in milk fat, animal fat and/or vegetable fat and total solids to replace the sweetness and functional properties of sucrose and the fats and solids, thereby obtaining a significant reduction in calories. The lactose in the frozen desserts containing milk products is converted by the enzyme lactase into galactose and glucose which is three times sweeter than lactose.

The amount of aspartame-containing composition of this invention used in the frozen desserts of this invention varies with the nature of the dessert and the amounts of sucrose and metabolizable fats normally present therein. For example, ice cream normally contains about 15-17% sucrose and corn syrup sweetener, about 10% or more butterfat and about 35% total milk solids. All of the sweetener can be replaced and part of the butterfat and milk solids can be replaced or enzymatically modified by the composition of this invention. Other frozen desserts normally contain from about 10 to 25% sucrose and other caloric sugar sweeteners and about 2 to 20% butterfat and milk solids. All of the sweetener and part of the milk fats or other fats, such as those in mellorine desserts, and solids in these other desserts can also be replaced or enzymatically modified by the compositions of this invention. High fat content ice creams such as Haagen-Dazs, Frusen Gladje or Alpen Zauber which have about 16% fats and about 20% air and Godiva which has about 20% fat and 20% air are considered quality products characterized as rich desserts. This invention achieves a frozen rich dessert of the same type without their caloric content. This is achieved by replacing the sugar in these desserts with aspartame and aspartame synergist sweeteners and the milk fats and solids therein with sucrose polyester fats to achieve the sweetness of sugar and the lack of aftertaste as well as the richness of a high fat content ice cream.

DETAILED DESCRIPTION OF THE INVENTION

The aspartame-containing composition of this invention is comprised of a combination of an aspartame-containing sweetener composition and a bulking agent composition. This combination contains about 0.1% to 1.0% sweetener and the remaining amount protein, carbohydrate and/or enzymes. Sufficient amount of the composition is added to the formulations for the frozen dietetic desserts of this invention to provide, on a weight basis, from about 0.04% to 1.4% aspartame therein.

The sweeteners contemplated for use in this invention are aspartame, which can be used alone or in combinations with another non-caloric or low caloric sweetener known to have synergistic sweetening properties with aspartame, e.g. saccharin, acesulfame, thaumatin, chalcone, cyclamate, stevioside and the like. The synergistic compositions are more economical and impart good sweetness without aftertaste. These synergistic mixtures contain about 50% by weight of each sweetener. Since the synergistic mixtures are sweeter than aspartame alone, lesser amounts are needed than of aspartame alone in the frozen dietetic desserts of this invention.

The bulking agent in the aspartame-containing compositions of this invention is comprised of carbohydrates which are not metabolizable and contribute no taste, for example, a suitable carbohydrate is polydextrose which, in liquid or solid form, supplies one calorie per gram. It can be used alone or in combination with a minor amount of sugar alcohols such as mannitol, xylitol and the like. These sugar alcohols contribute sweetness and are usually metabolizable. Sorbitol can be used in combination with polydextrose according to this invention when the sweetener composition is a combination of aspartame and its sweetness synergists noted above. Minor amounts of sugars such as corn syrup, fructose, dextrose or glucose contribute some sweetness and can also be present.

The function of the bulking agent is to provide structure and mouthfeel qualities which are normally provided by sucrose, fructose, sorbitol, or, in the case of non-dairy desserts, vegetable or animal fat, or honey.

Enzymes can also be used with the polydextrose as the bulking agent. The enzyme rennet, made from animal, bacterial or genetic engineering sources cures and structures the protein of milk and gives it bulk. Rennet is an example of a clotting enzyme, which type of enzyme is suitable for use in this invention. The enzyme lactase converts most of the lactose in milk, yogurt and whey to galactose and glucose, increasing the sweetness of lactose threefold. Whey, yogurt or milk not treated with lactase can be used in combination with polydextrose to help provide bulking and structure, but more of them are needed than if they are treated by clotting enzymes. Whey, for example, is used in sugar-free frozen yogurt by Bridge Farm Dairies, Mildenhall, Suffolk, England. Fermented whey can also be used as the bulking agent or in the bulking agent composition.

Other materials which can be used either as the bulking agent or in the bulking agent composition are carboxymethylcellulose (CMC) or carboxyethylcellulose (CEC) such as Avicel microcrystalline cellulose (TM of FMC Corporation, Philadelphia, Pa.). Tofu (soybean protein) act as a bulking agent in tofuti, a soybean protein frozen dessert in which the honey therein is replaced with an aspartame-containing sweetener composition according to this invention. Tofu can also be used in a bulking agent composition in non-dairy dietetic frozen desserts such as non-dairy mellorine. Other proteins produced by genetic engineering can also be used in the bulking agent compositions of this invention.

Although the above bulking agents are preferably used in combination with polydextrose, they can be used alone as bulking agents or in mixtures with each other in the frozen dietetic desserts of this invention.

The sweetener and bulking agent can be added to the frozen dietetic dessert formulation as is, either in liquid or particulate solid form, or can be encapsulated to form a free-flowing powder.

The frozen dietetic desserts of this invention such as ice cream must contain certain minimum amounts of milk fats and milk solids to be recognized as ice cream. The other frozen desserts such as ice milk, frozen yogurt, sherbet, tofuti and sorbet each have their own requirements which must be met in their formulations in order to be recognized as a particular type of dessert. For example, imitation ice creams, non-dairy dietetic frozen desserts, mellorines and tofuti can use other fats in place of milk fats, e.g. Lipifats (non-caloric fats) and sucrose polyesters such as Mardi Gras Fats. A sucrose polyester is a mixture of hexa-, hepta- and octa-esters formed by the reaction of sucrose with long chain fatty acids. Sucrose polyesters, a Procter and Gamble innovation, possess the same appearance and physical properties as usual dietary fats, however, they are neither digested nor absorbed as are fats and cholesterol. These non-caloric fats and sucrose polyesters are not metabolized and are thus a means to further reduce the caloric content of frozen desserts without sacrificing flavor, structure or mouthfeel. They can be used in some ice cream formulations to replace part or all of the milk fats and milk solids. These materials can replace from about 10% to 100% of the fats in frozen desserts.

Sucrose polyesters, because of their appearance and physical properties, can be used in a large variety of fatty foods as a replacement for the fats therein with the resultant reduction in caloric content. The sucrose polyesters, when used in this manner do not sacrifice flavor, structure or mouthfeel. Some of the foods in which sucrose polyesters can be used, in addition to the above mentioned dietetic frozen desserts, are margarine, salad oils and dressings, mayonnaise and the like. Thus, another aspect of this invention is the use of sucrose polyesters as a replacement for fats in high fat-containing foods, including those in which the sweetener therein is aspartame or aspartame in combination with a non-caloric or low caloric aspartame synergist sweetener, and the food products resulting therefrom. The sucrose polyester acts as a bulking agent as well as a replacement for the high calorie fats in such foods.

Mellorine frozen dessert formulations are defined by the United States Standard of Identity on food produced by freezing, under agitation, non-fat solids derived from milk and animal and/or vegetable fats, part of which may be milk fat. A typical mellorine frozen dessert formulation contains not less than 1.6 pounds per gallon of total solids and weighs not less than 4.5 pounds per gallon. The dietetic product of this invention, however, can be half of this weight per gallon and the air therein can be greater than the 100% overrun now permitted in non-dietetic mellorine desserts. The fat content of mellorine according to this invention is more than 2.7% by weight with a protein efficiency ratio not less than that of whole milk protein on the basis of the mellorine weight exclusive of any flavoring ingredients such as chocolate, cocoa, fruits or nuts. Vitamin a must be present in a quantity that will ensure 40 international units per gram of fatty substance (fat or sucrose polyester non-metabolizable fat by Proctor and Gamble). The melting point of the fats or neo fats can be from 30° C. to 41° C. and prepared by partial hydrogenation, blend of hard and soft margarine components and use of hardened sucrose polyesters. Higher melting points or the presence of fatty hydrogenated fats cause a greasy mouthfeel. The above criteria results in proper texture and consistency for spooning the frozen dessert. A stabilizer comprising one of several vegetable gums or other materials which act as stabilizers are also used as are emulsifiers such as mono- and di-glycerides, with or without polysorbate 60.

The following examples illustrate the effects of compositions of this invention on the acceptability, mouthfeel and sweetness of dietetic frozen desserts.

EXAMPLE 1

A 2×2 factorial design was used with factor one the bulking agent at levels of 13.9% polydextrose (Type N, Pfizer Co.) and 10% polydextrose/3.9% 36DE corn syrup solids and factor two being microcrystalline cellulose (Avicel RC-581, FMC Corp.) at levels of 0% and 1.5%. These were incorporated into a basic formulation consisting of 4% milkfat, 11% serum solids, 0.075% aspartame (NutraSweet brand, Searle), and 0.5% stabilizer/emulsifier (Summit, Germantown Manufacturing Co.). The 13 kg mixes were pasturized at 74° C. for 15 minutes, homogenized at 175/35 kg/cm$^2$, aged at 4° C. for 24 hours, flavored with a two-fold vanilla vanillin extract at a rate of 3 ml per kg, and frozen in an Emery Thompson 20 liter batch freezer to 90% overrun. Hedonic taste panel ratings were used to evaluate the products for sweetness, mouthfeel and overall acceptability as described by Amerine et al. "Principles of Sensory Evaluation of Food", Academic Press, New York, N.Y. (1965). The four desserts presented in a random order −12° C. on a 130 mm horizontal line scale were evaluated. The three open-ended lines were marked on the left side "not sweet", "not very smooth" and "dislike very much", and on the right side "very sweet", "very smooth" and "like very much", respectively. The lines then were measured from the left side to the panelist's slashes and responses which were recorded in millimeters. A two way analysis of variance was performed on each parameter after first blocking for the effects of panelist by the method of Ryan et al. "Minitab Student Handbook", Duxbury Press, N. Scituate, MA (1976).

EXAMPLE 2

A 4×2 design evaluated two levels of aspartame (0.05% and 0.01%) and four levels of polydextrose-PHA combinations such that carbohydrate levels remained at 14% (8% polydextrose+6% PHA, 10% polydextrose+4% PHA, 12% polydextrose+2% PHA and 14% polydextrose+0% PHA. These factors were incorporated into a basic mix consisting of 2% milkfat, 12% serum solids, 1% stabilizer(Summit) and 0.8% microcrystalline cellulose. The frozen desserts were prepared as in Example 1. Fifteen experienced panelists evaluated the 8 treatments plus a 14% sucrose trial which was replicated four times for sweetness and overall acceptability in 4 sessions. The order of presentation was randomized. The 130 mm line scales described in Example 1 were used. Analysis of variance was performed on the data with panelists effects being blocked. A line of best fit through the treatment means for sweetness was obtained using the regression techniques of Allan et al. "Analyzing Experimental Data by Regression", Lifetime Learning Publications, Belmont, CA. (1982). Of the 25% solids used to reduce caloric content 1.5% can be microcrystalline cellulose (Avicel) which is permissible under the United States Food and Drug Administration regulations. An overrun of about 80% is achieved although 100% is more preferred.

It was determined that added corn syrup solids significantly increased the intensity of sweetness ($p<0.05$) while the microcrystalline cellulose had no effect on intensity of sweetness. The analysis of variance for the mouthfeel parameter indicated that microcrystalline cellulose, corn syrup solids and the interaction of the two all had a significant effect ($p<0.01$) on mouthfeel. The added microcrystalline cellulose increased the perceived smoothness of the product, as did the added corn syrup solids. Microcrystalline cellulose and corn syrup solids also had a significant effect ($p<0.01$) on the overall acceptability of the products. Acceptability increased with the addition of microcrystalline cellulose and also increased as the polydextrose was decreased from 13.9% to 10% with replacement by 3.9% corn syrup solids.

These data lead to the conclusion that acceptable products could be formulated with polydextrose and aspartame in a low total solids frozen dessert. Microcrystalline cellulose aids in improving the perceived smoothness and overall acceptability. 13.9% polydextrose gave a slight aftertaste but 10% did not. The energy value of the product without corn syrup solids was 94.2 kcal/100 gm as determined by calculation (Merrill et al. Agriculture Handbook No. 74, United States Department of Agriculture, Washington, D.C. (1973).

Tests were run to determine the level of a bulking agent such as polydextrose which could be used to produce an acceptable dessert in the composition tested and to determine the level of aspartame which would give an equivalent sweetness to the 14% sucrose trial.

PHA was used to build up the total solids so as to formulate a sugar-free product. The fat content was reduced to 2% and slight modifications were made to the stabilizer content.

Both aspartame and polydextrose/PHA had a significant effect ($p<0.01$) on the intensity of sweetness of the products. Due to the high standard deviation associated with the taste panel data a regression line was fitted to the data means ($r^2=0.918$). The sweetness increased as the aspartame level increased, and the sweetness response decreased as the level of polydextrose was increased and PHA reduced. With regard to the sucrose trial, the indicated level of aspartame for equivalent sweetness falls in between the levels of aspartame used. The acceptability data showed a curvelinear relationship with polydextrose/PHA. Both aspartame and polydextrose/PHA had a significant effect on acceptability ($p<0.01$). The overall acceptability of the frozen desserts was reduced at high levels of polydextrose. It indicates that in the formulation used, a maximum of 12% polydextrose is satisfactory.

The energy value of these frozen desserts ranged from about 80.3 to 98.4 kcal/100 gm. This represents a reduction of 30-40% of the energy value of an ice milk of standard composition (4% fat and 135.6 kcal/100 gm. As indicated above, further calorie savings are achieved if either lactase or rennet are used, corn syrup is eliminated and/or the milk fat is replaced in part or in whole by about 10% to 100% Lipifat non-caloric fat.

The following examples illustrate typical frozen dietetic dessert formulations of this invention which are non-limiting since other formulations which suggest themselves to the art are contemplated herein.

EXAMPLE 3

Aspartame—Fermented Whey

A synergistic thickening composition made from fermented whey can also be used in combination with aspartame or aspartame and a synergistic sweetener as described above. The composition is prepared as follows:

(a) forming a fermentation broth of whey and yeast extract and fermenting the broth with *Xanthomonas campestris* ATCC 31923. The resulting product is mixed with a product produced as follows. (b) forming a fermentation broth of whey and sucrose and fermenting the broth with *Leuconostoc mesenteroides* ATCC14935.

The mixture of the product of (a) and (b) comprises from 0.1 to 4% of the functional dairy whey product of (a) with from 5 to 25% by weight of the functionalized dairy whey product of (b).

When mixed with the aspartame sweetener composition, the mixture of this Example 3 is used to make dietetic frozen desserts with excellent organoleptic and physical properties.

EXAMPLE 4

Mellorine Frozen Desserts

| Ingredient | Weight percent |
| --- | --- |
| Fat with 10%-100% sucrose polyesters | 4-16 |
| Milk solids non-fat or Tofu | 13-10 |
| Corn syrup solids (optional) | 6-5 |
| Stabilizer-emulsifier | 0.5 |
| Water | 50-75 |
| Overrun | 20-120 |
| Color, flavor | to suit |
| Aspartame | 0.05-0.08 |
| or with synergistic sweeteners saccharin, acesulfame, cyclamate, thaumatin, thaumasucre, African berry sweeteners | 20-50% of aspartame |
| mannitol | 6 |
| Polydextrose (Pfizer) | 12 |
| Avicel (FMC), microcrystalline cellulose or | 0.3-1.6 |
| Yogasucre, lactose sugars (Bridge Farm Dairies) and Yogalait, protein made by ultra filtration of whey (Bridge Farm Dairies) | 11 |
| or demineralized whey treated with lactase enzymes | 12 |
| or fermented whey as described herein | 12 |
| Rennet from calves or bacteria or by genetic engineering (Chr. Hansen Labs) (optional) | 1 |
| Lactase enzyme (Maxilact, Gist Brocades, Delft, Holland) and Lactozyme (Novo Laboratories, Copenhagen, Denmark); not to be used on tofu, mellorine or soft ice cream | 0.5 |

EXAMPLE 5

Ice Cream—Ice Milk

| Ingredients | Weight Percent | | | | | |
| --- | --- | --- | --- | --- | --- | --- |
| | A | B | C | D | E | F |
| Milk fat | 10 | 10 | 10 | 10 | 10 | 10 |
| Skim milk solids | 5 | 7 | 8 | 1.5 | 4 | 6 |
| Aspartame | 0.04 | 0.08 | 0.08 | 0.04 | 0.08 | 0.08 |
| Emulsifier | 0.1 | 0.1 | 0.1 | 0.1 | 0.1 | 0.1 |
| Avicel (MCC) | — | 1.15 | 1.15 | — | — | — |
| Na Caseinate | — | — | — | 2.0 | 2.0 | 2.0 |
| Starch | — | — | — | 2.0 | 2.0 | 2.0 |
| CMC | 0.15 | 0.15 | 0.15 | 0.15 | 0.15 | 0.15 |
| Carrageenan | 0.05 | 0.05 | 0.05 | 0.05 | 0.05 | 0.05 |
| Fructose | 4.0 | — | 4.0 | 4.0 | — | 4.0 |
| Xylitol | 6.0 | 6.0 | — | 6.0 | 6.0 | — |

EXAMPLE 6

Ice Cream—Ice Milk

| Ingredients | Weight Percent | | | | | |
| --- | --- | --- | --- | --- | --- | --- |
| | A | B | C | D | E | F |
| Milk fat | 10 | 12 | 6 | 4 | 1.5 | 4 |
| Skim milk solids | 4 | 10 | 12 | 13 | 3 | 13 |
| Aspartame | 0.08 | 0.133 | 0.067 | 0.133 | 0.133 | 0.067 |
| Emulsifier | 0.1 | 0.1 | 0.1 | 0.1 | 0.1 | 0.1 |
| Avicel (MCC) | — | — | 0.55 | — | — | 1.0 |
| Na Caseinate | 2 | — | — | — | — | 0.5 |
| Whey solids | 4 | — | — | — | — | — |
| Xanthan gum | — | — | 0.25 | — | — | — |
| CMC | 0.25 | 0.3 | — | — | — | 0.25 |
| Carageenan | 0.05 | — | — | 0.05 | — | 0.05 |
| Locust bean gum | — | — | — | 0.25 | — | — |
| Gelatin | — | — | — | — | 0.5 | — |
| Fructose | 4 | — | — | — | — | — |
| Mannitol | — | — | 5 | — | — | — |
| Thaumatin | — | — | — | — | — | 0.045 |
| Glycerin | — | — | 2 | — | — | — |
| Polyose | — | 15 | 5 | 16 | 34 | 15 |

EXAMPLE 7

Ice Cream—Ice Milk

| Ingredients | Weight Percent | | | | | |
| --- | --- | --- | --- | --- | --- | --- |
| | A | B | C | D | E | F |
| Milk fat | 4 | 4 | 10 | 8 | 10 | 6 |
| Skim milk solids | 13 | 13 | 12 | 12.5 | 12 | 13 |
| Aspartame | 0.067 | 0.067 | 0.133 | 0.133 | 0.067 | 0.067 |
| Emulsifier | 0.1 | 0.1 | 0.1 | 0.1 | 0.1 | 0.1 |
| Avicel (MCC) | 1 | 1 | — | — | 1 | 1 |
| Polydextrose (70% soln.) | — | — | 13.91 | 20.4 | 5.1 | 10.2 |
| Na Caseinate | 0.5 | 0.5 | — | — | 0.5 | 0.5 |
| CMC | 0.25 | 0.25 | 0.15 | 0.15 | — | — |
| Carrageenan | 0.05 | 0.05 | 0.05 | 0.05 | — | — |
| Mannitol | — | — | — | — | 5.75 | 5.75 |
| Stevioside | 0.045 | — | — | — | — | — |
| Acesulfame K | — | 0.067 | — | — | — | — |
| Polyose | 15 | 15 | — | — | — | — |

EXAMPLE 8

Ice Cream—Ice Milk

| Ingredients | Weight Percent | | | | | |
|---|---|---|---|---|---|---|
| | A | B | C | D | E | F |
| Milk fat | 5 | 5 | 5 | 10 | 10 | 4 |
| Skim milk solids | 13.25 | 13.25 | 13.25 | 15.5 | 15 | 13 |
| Aspartame | 0.133 | 0.133 | 0.067 | 0.067 | 0.067 | 0.133 |
| Emulsifier | — | 0.3 | 0.3 | 0.1 | 0.1 | 0.1 |
| Avicel (MCC) | — | — | — | 0.6 | 1 | 1 |
| Polydextrose (70% soln.) | 13.91 | 13.91 | 13.91 | — | — | — |
| Na Caseinate | — | — | — | — | 0.5 | 0.5 |
| Eggs | 8 | — | — | — | — | — |
| Gelatin | 0.33 | 0.33 | 0.33 | — | — | — |
| Mannitol | — | — | — | 5.75 | 5.75 | — |
| Polyose | — | — | — | — | — | 15 |
| Sucrose | — | — | 4.87 | — | — | — |
| CMC | — | — | — | 0.15 | 0.15 | 0.25 |
| Carrageenan | — | — | — | 0.05 | 0.05 | 0.05 |

EXAMPLE 9

Ice Cream—Ice Milk

| Ingredients | Weight Percent | | | | | |
|---|---|---|---|---|---|---|
| | A | B | C | D | E | F |
| Milk fat | 10 | 10 | 5 | 5 | 2.5 | 5 |
| Skim milk solids | 12 | 12 | 13.25 | 13.25 | 12 | 13.25 |
| Aspartame | 0.05 | 0.05 | 0.133 | 0.067 | 0.067 | 0.067 |
| Emulsifier | 0.1 | 0.1 | 0.1 | 0.1 | 0.1 | 0.1 |
| Avicel (MCC) | 0.55 | 0.51 | 1.15 | 1.15 | 1.15 | 1.15 |
| Polydextrose (70% soln.) | — | — | 15 | 10 | 10 | — |
| Xanthan gum | 0.25 | — | — | — | — | — |
| CMC | — | — | 0.2 | 0.2 | 0.2 | 0.2 |
| Carrageenan | — | 0.045 | 0.04 | 0.04 | 0.04 | 0.04 |
| Locust bean gum | — | 0.25 | — | — | — | — |
| Glycyrrhizinate | — | — | 0.04 | 0.04 | 0.04 | 0.04 |
| Mannitol | — | — | — | 5 | 5 | 5 |
| Dextrose | 17.75 | 17.75 | — | — | — | — |

EXAMPLE 10

Ice Cream—Ice Milk

| Ingredients | Weight Percent | | | |
|---|---|---|---|---|
| | A | B | C | D |
| Milk fat | 2.5 | — | — | 2.5 |
| Skim milk solids | 12 | 12 | 12 | 10 |
| Aspartame | 0.067 | 0.034 | 0.067 | 0.133 |
| Emulsifier | 0.1 | 0.1 | 0.1 | 0.1 |
| Avicel (MCC) | 1.15 | 1.25 | 1.25 | 1.0 |
| Polydextrose (70% soln.) | — | 6.8 | — | 4 |
| Soy protein | — | — | 3 | — |
| Whey solids | — | — | — | 3.25 |
| CMC | 0.2 | 0.25 | 0.1 | — |
| Carrageenan | 0.04 | 0.04 | 0.03 | 0.02 |
| Guar gum | — | — | — | 0.22 |
| Glycyrrhizinate | 0.04 | 0.04 | — | — |
| Fructose | — | — | 5.25 | — |
| Mannitol | 5 | 7.88 | — | — |

EXAMPLE 11

Ice Cream—Ice Milk with Lactase

| Ingredients | Weight Percent | | | | | |
|---|---|---|---|---|---|---|
| | A | B | C | D | E | F |
| Fat | 8 | 6 | 4 | 7 | 7 | 7 |
| Skim milk solids | 5.5 | 5.5 | 5.5 | 8.0 | 6.0 | — |
| Emulsifier | 0.1 | 0.1 | 0.1 | 0.1 | 0.1 | 0.1 |
| Aspartame | 0.08 | 0.08 | 0.08 | 0.08 | 0.08 | 0.08 |
| Avicel (MCC) | 1.15 | 1.0 | — | 1.15 | 1.15 | 1.15 |
| Polydextrose (70% soln.) | — | 5.1 | 13.91 | — | — | — |
| CMC | 0.15 | 0.15 | 0.15 | 0.15 | 0.15 | 0.15 |
| Carrageenan | 0.05 | 0.05 | 0.05 | 0.05 | 0.05 | 0.05 |
| Whey (sweet) | — | — | — | 64.4 | — | — |
| Whey syrup | — | — | — | — | 14.2 | — |
| Whey powder | 5.5 | 5.5 | 5.5 | — | — | 14.6 |
| Lactase EU/kg mix | 600 | 600 | 600 | — | — | — |
| Lactozym 1500L | — | — | — | 0.05–0.2 | 0.05–0.2 | 0.05–0.2 |

EXAMPLE 12

Sherbet

| Ingredients | Weight Percent | | | | |
|---|---|---|---|---|---|
| | A | B | C | D | E |
| Fat | 2.1 | 2.1 | — | — | — |
| Skim milk solids | 1.9 | 1.9 | 1.9 | 1.5 | 1.5 |
| Aspartame | 0.05 | 0.067 | 0.133 | 0.133 | 0.133 |
| Avicel (MCC) | — | — | 0.5 | 1.15 | — |
| Polydextrose (70% soln.) | — | — | 5 | — | 13.91 |
| CMC | — | — | 0.15 | 0.15 | — |
| Carrageenan | — | — | 0.05 | 0.05 | — |
| Pectin | 0.4 | — | — | — | — |
| Gelatin | — | 0.5 | — | — | 0.33 |
| Sucrose | 5 | — | — | — | — |
| Mannitol | — | 5 | — | — | — |
| Citric acid | 0.25 | 0.25 | 0.25 | 0.25 | 0.25 |
| Fruit conc. | 15 | 15 | 15 | 15 | 15 |

EXAMPLE 13

Water Ice

| Ingredients | Weight Percent | | | | |
|---|---|---|---|---|---|
| | A | B | C | D | E |
| Aspartame | 0.133 | 0.133 | 0.05 | 0.05 | 0.05 |
| Mannitol | — | — | 5 | — | — |
| Corn syrup | — | — | — | — | 5 |
| Sucrose | — | — | — | 5 | — |
| Avicel (MCC) | 1.15 | 1.15 | — | — | 0.75 |
| Polydextrose (70% soln.) | — | — | 3 | — | 2 |
| CMC | — | 0.15 | — | 0.15 | 0.15 |
| Carrageenan | — | 0.05 | — | 0.05 | 0.05 |
| Citric acid | 0.25 | 0.25 | 0.25 | 0.25 | 0.25 |
| Fruit conc. | 15 | 15 | 15 | 15 | 15 |
| Pectin | 0.4 | — | — | — | — |
| Gelatin | — | — | 0.3 | — | — |

EXAMPLE 14

| Ingredients | Weight Percent |
|---|---|
| Mix 1 | |

-continued

| | |
|---|---|
| Skim milk | 48 |
| Yogurt Fruit | 20 |
| Starter | 3.2 |

| Ingredients | A | B | C | D | E | F |
|---|---|---|---|---|---|---|
| Mix 2 | | | | | | |
| Aspartame | 0.133 | 0.133 | 0.133 | 0.05 | 0.08 | 0.05 |
| Mannitol | — | — | — | 5 | — | — |
| Xylitol | — | — | — | — | 6 | — |
| Corn syrup | — | — | — | — | — | 4 |
| Pectin | 0.4 | 0.4 | 0.4 | 0.4 | 0.4 | 0.4 |
| Avicel (MCC) | 0.5 | — | 0.25 | 0.25 | 0.25 | 0.25 |
| Polydextrose (70% soln.) | — | 7 | 3.5 | 3.5 | 3.5 | 3.5 |

The ingredients in all the above formulations are combined in the conventional procedures for making the exemplified frozen dietetic dessert. The resulting products display acceptable taste, mouthfeel and structure.

EXAMPLE 15

Frozen Dessert

| Ingredients | Weight Percent |
|---|---|
| Milk fat solids | 4 |
| Non-milk fat solids | 12 |
| MCC (Microcrystalline cellulose) | 0.6 |
| Polydextrose | 12 |
| Fermented demineralized whey | 4 |
| Lactase enzyme | 0.2 |
| Aspartame | 0.6 |
| Flavor | to suit |
| Color | to suit |
| Water | to 100 |

Procedure:

Combine milk fat solids, non-fat milk solids, polydextrose, microcrystalline cellulose, fermented demineralized whey, aspartame and water into a vat for solubilization. Heat to 133°–120° F. while agitating the mix until all ingredients are dissolved. The temperature must be maintained at no higher than 120° F. so the aspartame will not decompose or lose effectiveness. Pasteurize the mix by HTST methods and homogenize at about 2,200 PSI in the first stage and at 500 PSI in the second stage prior to cooling to 38° F., cool to about 38° F. and age for about 20 hours. Add color and flavor and freeze while blowing air to 120%.

The dessert thus prepared has approximately 100 calories per 100 gram serving, whereas standard ice cream has 200 calories per 100 gram serving.

By substituting aspartame in combination with synergistic sweeteners, as little as 0.2% by weight aspartame can be used in the formulation. By substituting sucrose polyester, Lipifats non-caloric fats or Mardi Gras Fats for about 50% of the milk fat solids, the calorie content can be reduced even further and there is obtained an ideal frozen dessert of high quality and low calories.

In preparing sugar-free desserts such as frozen yogurt and other dairy desserts as well as soybean and non-dairy desserts, aspartame and its synergistic sweetener mixtures are incorporated into such desserts including soybean and non-dairy desserts sold in the chilled (not freezer) compartments of grocery stores and supermarkets.

With the exception of plain yogurt, dessert yogurts contain a flavor such as vanilla, coffee, chocolate or fruit, or a puree of fruit, fruit jam or fruit. Sugar is added to these mixes, usually to the extent of 10% solids content of the yogurt or dessert.

Aspartame is added to the yogurt culture at about 1/160 the amount of sugar to replace 51% to 100% of the sucrose or other nutritive caloric sugar. Aspartame-synergistic sweetener mixtures can also be used according to this invention. The synergist thaumatin is ideally suited for flavor and sweetness enhancement with as little as 0.0001 parts of sweetener (called "Sweetin"). The "Sweetin" simultaneously with flavor and sweetness enhancement creates a novel flavor for chilled desserts as well as all diet desserts which do not require intensive heating. When heating is required, the synergistic sweetener which can then be used is acesulfame.

The source of the thaumatin is not critical to this invention since thaumatin made by genetic engineering is as good for sweetening as thaumatin extracted from the katemfe African bush. It is described in Merck Index, 9th Edition, 1194, (1976) as being a sweet tasting basic protein extracted from the fruit of the tropical plant *Thaumatoccoccus danielli* Benth., Martanaceae found in Western Africa. For special flavoring effects, mixtures of stevioside, monellin, serendipity berry and miracle berry extracts can also be used.

Further reduction in the calorie content of the above described dairy desserts is attained by using the enzyme lactase which converts about 50% or more of the milk lactose present therein into the much sweeter glucose and galactose.

A further substantial reduction in calories can be attained by replacing about 10% to 100% of the caloric fats in the yogurt or dessert with sucrose polyester as described hereinabove. Such a low calorie yogurt is identified as "Logurt".

The above described desserts may be used frozen, chilled or, where possible, at room temperature.

I claim:

1. A sweetener-bulking agent composition suitable for use in dietetic frozen desserts comprising:
   (a) as the sweetener, mixtures of aspartame with a synergistic sweetener selected from the group consisting of thaumatin, acesulfame K, saccharin, chalcone, stevioside, cyclamate, glycyrrhizin and mixtures thereof or aspartame alone, and
   (b) as the bulking agent,
      (i) a material selected from the group consisting of polydextrose, microcrystalline cellulose, fermented whey, a mixed culture of *Lactobacillus bulgaricus* and *Streptococcus thermophilus*, soy bean protein, sucrose polyester and mixtures thereof; or
      (ii) a material selected from the group consisting of polydextrose, microcrystalline cellulose, fermented whey, soy bean protein, sucrose polyester and mixtures thereof, in combination with a minor amount of a material selected from the group consisting of sugar alcohols, sugars, whey, rennet, lactase and mixtures thereof;
   with the proviso that when aspartame alone is the sweetener, the bulking agent is not polydextrose alone or a mixture of polydextrose and microcrystalline cellulose, and when polydextrose alone is the bulking agent, the sugar alcohol, if present, is not sorbitol.

2. A sweetener-bulking agent composition of claim 1 comprising a mixture of aspartame with said synergistic sweetener and a mixture of fermented whey and polydextrose.

3. A sweetener-bulking agent composition of claim 1 comprising a mixture of aspartame with said synergistic sweetener and a mixture of fermented whey, polydextrose and microcrystalline cellulose.

4. A sweetener-bulking agent composition of claim 1 comprising aspartame with a mixture of fermented whey and polydextrose.

5. A sweetener-bulking agent composition of claim 1 comprising aspartame and a mixture of fermented whey, polydextrose and microcrystalline cellulose.

6. A sweetener-bulking agent composition of claim 1 comprising mixtures of aspartame with said synergistic sweetener or aspartame alone, in combination with polydextrose, microcrystalline cellulose or mixtures thereof, and lactase.

7. A sweetener-bulking agent composition of claim 1 comprising mixtures of aspartame with said synergistic sweetener or aspartame alone, in combination with polydextrose, microcrystalline cellulose or mixtures thereof, and rennet.

8. A sweetener-bulking agent composition of claim 1 comprising mixtures of aspartame with said synergistic sweetener or aspartame alone, in combination with polydextrose and mannitol or xylitol.

9. A dietetic frozen dessert selected from the group consisting of ice cream, ice milk, frozen yogurt, sherbet, sorbet and tofu-containing, containing as the sole sweetener-bulking agent composition, a composition of claim 2.

10. A dietetic frozen dessert selected from the group consisting of ice cream, ice milk, frozen yogurt, sherbet, sorbet and tofu-containing, containing as the sole sweetener-bulking agent composition, a composition of claim 3.

11. A dietetic frozen dessert selected from the group consisting of ice cream, ice milk, frozen yogurt, sherbet, sorbet, mellorine and tofu-containing, containing as the sole sweetener-bulking agent composition, a composition of claim 1.

12. A sweetener-bulking agent composition of claim 1 comprising a mixture of aspartame with said synergistic sweetener and sucrose polyester.

13. A dietetic frozen dessert selected from the group consisting of ice cream, ice milk, frozen yogurt, sherbet, sorbet and tofu-containing, containing as the sole sweetener-bulking agent composition, a composition of claim 12.

14. A sweetener-bulking agent composition of claim 1 comprising aspartame and sucrose polyester.

15. The ice cream of claim 11 containing as the sweetener-bulking agent, aspartame and a mixture of polydextrose and sucrose polyester.

16. A dietetic frozen dessert of claim 11 which is sherbet or sorbet containing a sugar-free fruit flavor composition and containing aspartame as the sole sweetener.

17. A dry mix composition suitable for use in making a dietetic frozen yogurt or dietetic yogurt comprising: as the sweetener, mixtures of aspartame with a synergistic sweetener selected from the group consisting of thaumatin, acesulfame K, cyclamate, glycyrrhizin, saccharin, chalcone, stevioside and mixtures thereof or aspartame alone; in combination with yogurt cultures and a bulking agent selected from microcrystalline cellulose, dry fermented whey, rennet, solid lactase, solid polydextrose and mixtures thereof.

18. A sugar fre yogurt containing a composition of claim 17.

19. The composition of claim 18 containing a sugar-free fruit flavor in which the sugar normally therein is replaced by aspartame as the sole sweetener.

20. A dietetic frozen dessert selected from the group consisting of ice cream, ice milk, frozen yogurt, sherbet, sorbet and tofu-containing, having from about 10% to 100% of the fat replaced by sucrose polyesters as a bulking agent and, as the sole sweetener, aspartame alone or a mixture of aspartame with a synergistic sweetener selected from the group consisting of thaumatin, acesulfame K, saccharin, chalcone, stevioside, cyclamate, glycyrrhizin and mixtures thereof.

21. A dietetic frozen dessert of claim 20 which is ice cream.

22. A dessert of claim 20 which is a tofu-containing frozen dessert.

23. A dietetic dairy dessert selected from the group consisting of tofu-containing and yogurt, containing as the sweetener-bulking agent a mixture of aspartame with a synergistic sweetener selected from the group consisting of thaumatin, acesulfame K, saccharin, chalcone, stevioside, cyclamate, glycyrrhizin, and mixtures thereof, and soy protein isolates and milk with a mixed culture of *Lactobacillus bulgaricus* and *Streptococcus thermophilus.*

24. A dietetic frozen dessert selected from the group consisting of ice cream, ice milk, frozen yogurt, sherbet, sorbet and tofu-containing, with between 2% and 16% by weight of its solid content as a butterfat or vegetable fat and as a bulking agent, sucrose polyester which contains aspartame as the sole sweetener said composition having an overrun of between 10% and 90%.

25. A dietetic frozen dessert of claim 24 containing tofu, soybean isolate or mixtures thereof, aspartame as the sweetener and on a weight basis, from 2% to 11.5% of vegetable fat, butterfat or mixtures thereof with an overrun of from 20% to 60%.

26. A sweetener-bulking agent-containing dietetic sugar-free and corn syrup-free frozen dessert selected from the group consisting of ice cream, ice milk, frozen yogurt, sherbet, sorbet and tofu-containing, containing a butterfat or vegetable fat and sucrose polyester in an amount on a dry weight basis of between 2% and 16% and polydextrose in the bulking agent and as the sole sweetener, aspartame alone or a mixture of aspartame with a synergistic sweetener selected from the group consisting of thaumatin, acesulfame K, saccharin, chalcone, stevioside, cyclamate, glycyrrhizin and mixtures thereof.

27. A dietetic flavored or fruit flavored yogurt which is sugar-free and corn-syrup free containing as the sole sweetener aspartame, and as a bulking agent a mixture of *Lactobacillus bulgaricus* and *Striptococcus thermophilus.*

* * * * *